(No Model.)
J. M. MILLER.
FUMIGATING APPARATUS.
No. 510,079. Patented Dec. 5, 1893.
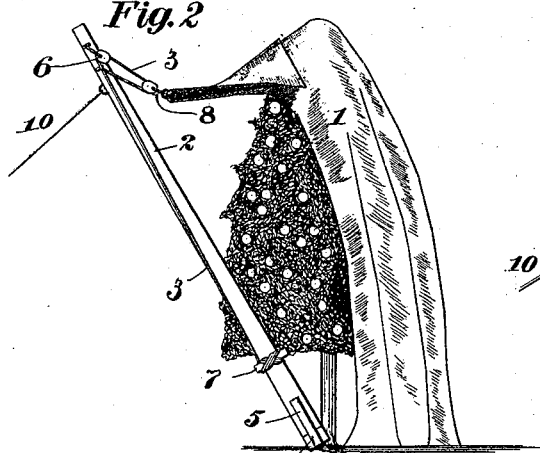
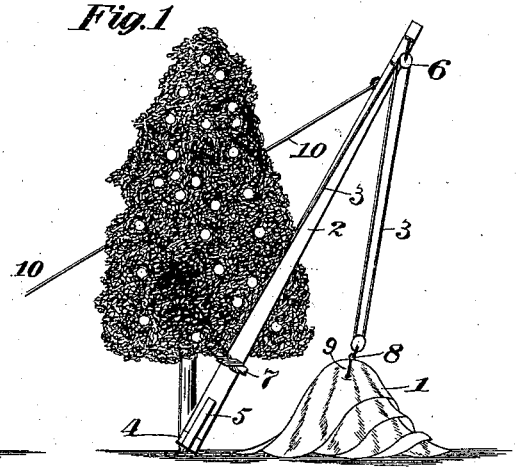
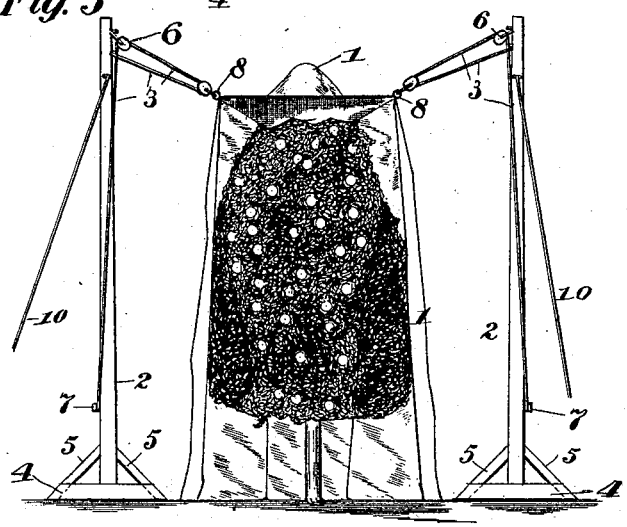
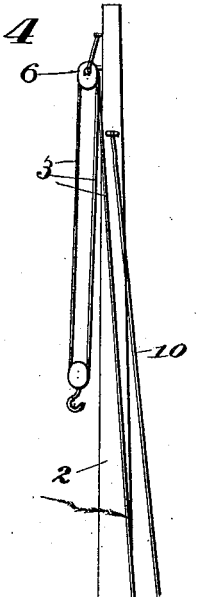
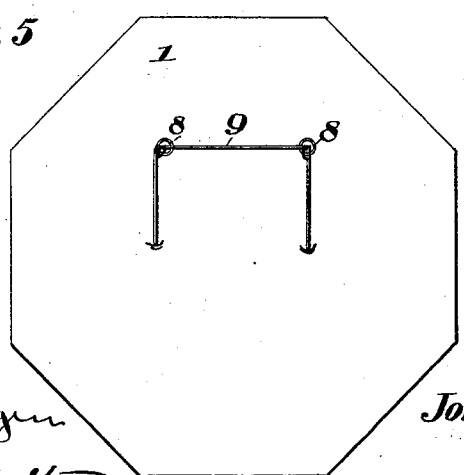
WITNESSES:
INVENTOR
John M. Miller
BY
W. S. Boyd,
ATTORNEY.
THE NATIONAL LITHOGRAPHING COMPANY,
WASHINGTON, D. C.

UNITED STATES PATENT OFFICE.

JOHN M. MILLER, OF RIVERSIDE, CALIFORNIA.

FUMIGATING APPARATUS.

SPECIFICATION forming part of Letters Patent No. 510,079, dated December 5, 1893.

Application filed August 17, 1892. Serial No. 443,338. (No model.)

*To all whom it may concern:*

Be it known that I, JOHN M. MILLER, a citizen of the United States, residing at Riverside, in the county of San Bernardino and State of California, have invented certain new and useful Improvements in Methods of and Apparatus for Fumigating Trees; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a method of and apparatus for fumigating trees and plants for the purpose of destroying insects and other pests that infest them and injure the trees and fruits, and it has been found that they can be destroyed by fumigating the plants easier than in any other way. To properly fumigate the tree, requires that it be enveloped in a tent and the fumigating gas introduced and retained around and through the tree until it has accomplished its work.

In devices of this kind heretofore used, it has been found that the means for raising the tent to the top of a tree has been difficult to operate and move from one tree to the other, and a very slight wind would interfere with the elevation of a tent to such degree that it could not be operated successfully.

The objects of my invention are to avoid these objections and to enable the tent to be raised at any time and also to simplify the means by which it can be operated. I attain these objects by means of the apparatus which will be hereinafter more fully set forth, reference being had to the accompanying drawings, in which—

Figure 1 is a view of a tree with the apparatus in position for placing the tent over the tree. Fig. 2 is a similar view with the tent partially over the tree. Fig. 3 is a view of a tree, taken at right angles to Figs. 1 and 2. Fig. 4 is a view of one of the derricks used in elevating the tents, and Fig. 5 is a plan view of one form of the tent.

Referring more particularly to the drawings 1 indicates the tent, which is flat when placed on the ground and may be of any desired outline, as for instance four or eight square, or it might be made round or circular.

2, 2, indicate the derricks by means of which the tent is raised up and spread over the tree, and 3, 3, are the ropes by which the tent is raised. The derricks may be made out of wood or iron, and are each provided with a base 4, and braces 5, 5. They are each made of sufficient height to stand above the tops of the tallest trees to be fumigated, or if desired they may be made extensible so that they can be elevated above the tallest tree that is likely to be found. At the top of the pole or derrick, is placed a pulley 6 through which the rope 3 is drawn in elevating the tent, one end of the rope being secured near the top of the derrick, and the other end being brought down nearly to the bottom of the derrick and secured by any suitable means, as for instance, on a belaying cleat 7, or it may be secured in any other way, as for instance by means of a windlass. The loop of the rope between the end that is fastened near to the top of the derrick and the pulley at the top, is provided with a snap hook which engages with a ring 8 which is secured to the rope 9 that is secured to the tent. The ends of the rope 9 are secured to the under side of the tent, and the rings 8 8, are secured at the bend of the rope, as shown in Fig. 5. The braces 5, 5, are placed upon opposite sides of the derricks so that they will not only prevent the derrick from toppling or falling over in that direction, but will permit of its being swung or moved over in a direction at right angles to the braces. As the base is secured to the bottom of the derrick and to the outer ends of the braces, it will act as a pivotal point for the derrick as it is being operated.

The poles or derricks 2, 2, are operated by means of guy ropes 10, 10, which are secured to the upper ends of the derricks, and are held by the assistants, who by pulling upon the ropes can swing the tops of the derricks over the trees, and thus spread the tent over the tree after it has been elevated by means of the ropes 3, 3.

In operating my fumigating apparatus, the two derricks are placed upon opposite sides of the tree to be fumigated, with the bases 4, 4 substantially in a line with the tree, so that the tops of the derricks may be swung back and forth past the top of the tree. The tent is placed at one side of the tree, and the hooks on the ropes 3, 3, are secured to the rings 8, 8, and the tops of the derricks are inclined so that they are substantially over the tent, as shown in Fig. 1. The portion of the tent to which the rope 9, is secured is then drawn up to the top of the derrick by means of the rope 3, and the portion of the tent between the edge and the rope, 9, is folded back over the top of the tent, as shown in Fig. 2. This arrangement of the derrick and of the flap of the tent, permits the tent to be drawn up at the side of the tree without catching upon any of the limbs, and also avoids the necessity of raising the tent any higher than the top of the tree. As soon as the tent has thus been raised as far as it will go, the operators holding the guy ropes will walk backward drawing the tops of the derricks over the top of the tree, until the portion of the tent to which the rope 9 is secured has passed entirely over the tree. The ropes 3, 3, are then released from the belaying cleat on the derrick, and the edge of the tent is permitted to fall to the ground, thus entirely enveloping the tree, the opposite edge of the tent having remained upon the ground all the time. While the tent is being raised, the tops of the derricks are prevented from leaning in toward the tree, by drawing the guy ropes outward laterally from the tree sufficiently to hold the derricks straight. The bases, 4, 4, of the derricks which are, preferably, about six feet long, will assist very materially in holding the derricks in a vertical position. As soon as the tent has thus been spread over a tree, any desired fumigating gas or material may be introduced within the tent, and be permitted to remain there as long as desired. In removing the tent, the edge to which the rope 9 is secured is raised to the top of the derricks, and the derricks swung back into their original position, and the tent again lowered to the ground. The ropes 3, 3, are then detached from the tent, and the derricks can be easily carried to the next tree, and set up and the tent be spread over that tree in the same manner as described above.

As there is no very great strain to come upon the derricks, it is evident that they can be made very light and cheap, and as the tent is made perfectly flat it can be made out of any desired number of strips of cloth sewed together, and thus the whole device can be made very cheap. By being able to detach the tent from the derricks, the separate pieces can be very easily carried from one tree to another, without the necessity of having to supply them with wheels or runners, and drawing the whole apparatus over the ground, and by not having to raise the tent higher than the top of the tree, and by keeping it upon the ground till it is ready to be raised and spread over the tree, the apparatus can be used even though the wind be blowing.

Having thus described my invention, I claim—

1. The herein described method of applying a fumigating tent to an article to be fumigated consisting in folding a portion of the tent back upon itself, then raising the doubled portion of the tent to the desired height, then passing it over the top of the article to be fumigated and then releasing it and letting the edge of the doubled portion fall to the ground, substantially as set forth.

2. In a fumigating apparatus, in combination, two derricks placed upon opposite sides of a tree, a flat tent having a rope secured to the under side thereof, a rope from each derrick to the rope of the tent, and secured to the under side thereof for elevating the tent and ropes for swinging the tops of the derricks over the top of the tree, substantially as set forth.

3. In a fumigating apparatus, in combination, two derricks placed upon opposite sides of a tree, independently of each other, each derrick being provided with a narrow base, projecting upon opposite sides thereof, whereby the top of the derrick may be moved in a plane at right angles to the base, a pulley at the top of each derrick, a flat tent between the derricks, two hoisting ropes detachably secured to the under side of the tent and each passed through the pulley at the top of its respective derrick, and means for operating the derrick, substantially as set forth.

In testimony whereof I affix my signature in presence of two witnesses.

JOHN M. MILLER.

Witnesses:
GEORGE DANIELS,
MATT A. DAWKINS.